United States Patent [19]

Rose

[11] Patent Number: 4,851,128

[45] Date of Patent: Jul. 25, 1989

[54] PULP MILL WASTE COLOR REMOVAL WITH CARBON ABSORBENTS

[75] Inventor: Gerard R. Rose, Park Ridge, Ill.

[73] Assignee: Nalco Chemical Company, Naperville, Ill.

[21] Appl. No.: 255,574

[22] Filed: Oct. 11, 1988

[51] Int. Cl.$^4$ ............................................. C02F 1/28
[52] U.S. Cl. .................................. 210/669; 210/670; 210/679; 210/694; 210/917; 210/928
[58] Field of Search ............... 210/665, 666, 669, 679, 210/694, 735, 917, 928, 670, 675, 676, 668

[56] References Cited

U.S. PATENT DOCUMENTS

| | | | |
|---|---|---|---|
| 3,288,770 | 11/1986 | Butler | 260/88.3 |
| 3,738,945 | 6/1973 | Panzer et al. | 260/2 BP |
| 4,134,786 | 1/1979 | Fletcher et al. | 210/694 |
| 4,668,403 | 5/1987 | Walterick et al. | 210/917 |
| 4,695,386 | 9/1987 | Berry | 210/928 |

FOREIGN PATENT DOCUMENTS 731212  3/1966  Canada.

OTHER PUBLICATIONS

*Activated Carbon*, by John W. Hassler, Chapter 8, Chemical Publishing Company, Inc., 1963.

Primary Examiner—Ivars Cintins
Attorney, Agent, or Firm—John G. Premo; Donald G. Epple; Anthony L. Cupoli

[57] ABSTRACT

Carbon absorbents are used to remove color bodies from paper mill waste waters. A preferred embodiment of the process utilizes pretreatment of the paper mill waste waters with cationic flocculants.

10 Claims, 15 Drawing Sheets

EVALUATION OF VARIOUS ADSORBENTS FOR COLOR REMOVAL

PULP MILL WASTE COLOR REMOVAL WITH CARBON ABSORBENTS

INTRODUCTION

Waste waters from pump mills that produce bleached, chemical pulps have a characteristic black or very dark brown color, even after the waste has experienced the usual waste treatment scheme of primary clarification, aeration, and secondary clarification. The molecules which are primarily responsible for this very intense color are thought to be degraded, oxidized lignins which are separated from the pulp primarily at the first caustic extract stage of the bleach plant. These molecules pass unchanged through the waste treatment plant because they are fairly refractory towards the biological treatment in the aeration basin. In the past, the reason to remove color from these waste waters was entirely aesthetic. Recently it has been recognized that part of this color is comprised of halogenated organics, the emphasis has therefore switched to removal of these molecules. Nonetheless, the problem remains the same. Color is not removed without removing the halogenated organics. Further, some of the light absorbing molecules are also halogenated organics.

Research in this area dates from the 1950's. There are, consequently, many different processes, chemical programs, and technologies which are available for use in this application, yet until recently none has ever been applied. Every available means of removing pulp mill waste color suffers from being either very expensive to apply or having serious operational drawbacks or both. This invention proposes a new method of removing pulp mill waste color which does not suffer from the serious drawbacks of existing technologies.

This process for color removal from paper mill waste waters utilizes an adsorbent to achieve the separation of the color-causing molecules referred to hereafter as color bodies from these waste waters. The adsorbent is an adsorbent form of carbon such as activated carbon.

THE DRAWINGS

THE INVENTION

Figure 1:
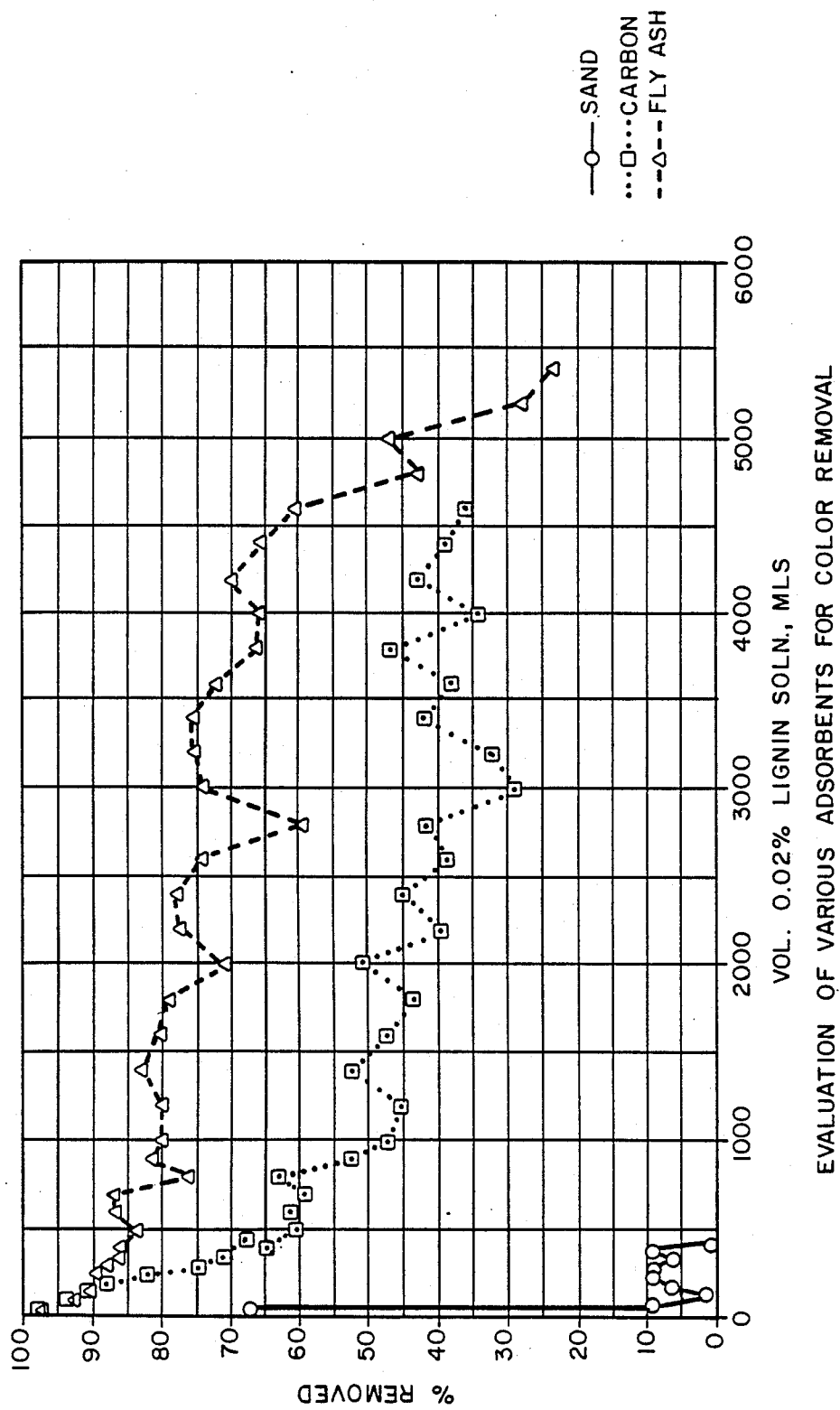
FIG. 1 is an evaluation of various adsorbents for color removal.

The invention comprises a method of decoloring pulp mill waste waters which contain color bodies which comprises the steps of:
 (a) contacting these waste waters with a carbon adsorbent whereby the color bodies are adsorbed from the waste waters,
 (b) removing the adsorbent from contact with these waste waters when it has adsorbed substantial quantities of the color bodies,
 (c) heat treating the adsorbent at a generated temperature and for a period of time sufficient to pyrolyze a substantial portion of the color bodies adsorbed by the adsorbent, and then,
 (d) reusing the adsorbent to repeat steps (a) through (c).

In a preferred embodiment of the invention, the pulp mill waste waters are preconditioned with a cationic flocculant.

THE CARBON ADSORBENT

The adsorbent may be selected from any number of adsorbents that contain as their predominant ingredient carbon. This includes, but is not limited to coals of varying types such as anthracite, bituminous coals, peat, humic acids and the like.

The preferred carbon adsorbent is activated carbon. Activated carbons are well known and may be manufactured from a variety of carbon sources. For a description of the carbon sources and the method of converting them into activated carbons, reference may be had to *Activated Carbon*, by John W. Hassler, published by Chemical Publishing Company, Inc., 1963; chapter 8 which is incorporated herein by reference.

Activated carbons vary with respect to their properties. In the practice of this invention it is desirable that average pore size be greater than 10 Angstrom units.

The activated carbons most useful in the invention should have a surface area of at least 500 sq. meters per gram or more. As will be shown by the examples hereafter presented, the surface area and pore volume limitations described above do not always produce the best activated carbon for a particular paper mill waste water color removal treatment. The best method for determining an optimum activated carbon for treating a particular waste water is routine experimentation. Other limitations useful in selecting activated carbons include base exchange capacity and particle size.

The carbon adsorbents, and in particular activated carbon, may be used in the form of a slurry or contained in a column to treat the paper mill waste waters in accordance with the process of the invention. Depending upon the particular mode of operation, e.g. slurrying the carbon with the waste water or passing the waste water through a column of activated carbon will determine the optimum particle size of the carbon.

In the case of slurry operations, the particle size should range between 5mm to .005mm. In the case of column operation, which represents the preferred mode, the carbon or activated carbons should have a particle size range between 5mm to .25mm and preferably 1 to 0.4mm.

CONTACT TIME OF THE CARBON WITH THE PAPER MILL WASTE WATERS

In a column operation, the paper mill waste waters are circulated through the bed in either series or parallel flow to give a flow rate of at least 0.13 ft. per minute. A preferred flow rate is 0.25 to 1.07 ft. per minute. Flow is continued until the column reaches near its saturation of the color bodies contained in the paper mill waste water.

The flow rate and the adsorptive characteristics of the carbon will vary depending upon the temperature of the paper mill waste water, the nature and amount of the color bodies contained in the waste water and the type and activity of the carbon adsorbent chosen.

REGENERATION

After a substantial portion of the adsorptive capacity of the carbon has been reached, contact of the waste water with the carbon is discontinued. The carbon is then subjected to regeneration which is a heat treatment step which removes the color bodies adsorbed by the carbon thus rendering the carbon available for reuse in adsorbing more color bodies.

The regeneration temperature preferably should be at a minimum of 250° C. for several hours or longer.

The regeneration temperature may be such that the color bodies are substantially all or in part converted to additional activated carbon. A favorable temperature range used to produce activated carbon which may also be used for the regeneration of the color body exhausted carbon may vary from between about 250° C. up to about 1,000° C. A most preferred temperature range will usually be between 250°-600° C.

The temperature at which the regeneration is achieved will depend upon the nature of the adsorbed color bodies, whether or not there are metallic impurities present with the color bodies and the conditions of the regeneration. While using the term "pyrolysis", it is understood that it also includes the heat treatment of the carbon containing the adsorbed color bodies to the presence of oxygen. The conditions of the pyrolysis or heat treatment should be such as to minimize oxidation of the carbon adsorbent whereby oxides of carbon are formed. For the various temperature and conditions used to prepare activated carbon, reference may be had to Chapter 8 of the Hassler treatise previously described.

The time of regeneration will vary depending upon the temperature, the amount and type of color bodies adsorbed by the carbon, the conditions of combustion, e.g. presence or absence of oxygen and the like.

When carbon adsorbents other than activated carbon are used, a number of regeneration cycles will convert at least a portion of adsorbed color bodies into a form of activated carbon thereby improving the efficiency of the starting carbon absorbent to adsorb greater quantities of color bodies.

PRETREATMENT OF THE PAPER MILL WASTE WATERS WITH A WATER-SOLUBLE CATIONIC FLOCCULANT

In a preferred embodiment of the invention, it has been found that the adsorptive capacity of the carbon can be greatly increased if the paper mill waste water containing the color bodies is pretreated with a cationic flocculant. This pretreatment utilizes water-soluble chemicals that are known to either flocculate, or in certain instances coagulate, suspended solids from aqueous systems. For convenience, both types of these chemicals are referred to as flocculants.

It is known that such cationic chemicals, when used to treat the paper mill waste waters in dosages capable of producing flocculation or coagulation of the color bodies, the color bodies in the paper mill waste waters are reduced. These treatments are prohibitively expensive and therefore have not been used to any great extent commercially. The conditioning amount of the water-soluble cationic flocculant used in the practice of this invention is substantially less than the amount that would produce flocculation or coagulation of the color bodies. Thus, the amount is usually about $\frac{1}{4}$-$\frac{1}{2}$ that amount required to remove color bodies from the paper mill waste waters by flocculation or coagulation. In some instances, even lower amounts may be effectively employed to condition the color bodies prior to contact with the activated carbon adsorbent. The particular amount required will depend upon the carbon to be treated, the nature of the color bodies contained in the paper mill waste waters and the like. Routine experimentation can determine optimum dosages. Furthermore, removal of color bodies from pulp and paper mill waste streams by coagulation processes results in the formation of a difficult, hard-to-handle sludge.

THE WATER-SOLUBLE CATIONIC FLOCCULANTS

These chemicals, as indicated, may be either flocculants or coagulants but for purposes of this disclosure it is elected to refer to them simply as flocculants. The preferred class of flocculants are the water-soluble cationic polymers. The most preferred of this class being polydiallyl dimethyl ammonium chloride polymers which for the purpose of this invention should have a molecular weight of at least 3,000 up to a molecular weight not exceeding 1,000,000 weight average. A preferred molecular weight range is 10,000 to 150,000 weight average. These molecular weights are weight average molecular weights. The polydiallyl dimethyl ammonium chloride polymers and their method of preparation are described in U.S. Pat. No. 3,288,770, the disclosure of which is incorporated herein by reference.

Another class of water-soluble cationic polymers are formed by the reaction of halohydrins such as epichlorohydrin with lower alkyl diamines. Products of this type are described in U.S. Pat. No. 3,738,945, the disclosure of which is incorporated herein by reference. A preferred group of polymers covered by this patent are formed by the reaction of epichlorohydrin with dimethylamine.

Additional cationic polymers are described in Canadian Patent No. 731,212, the disclosure of which is incorporated herein by reference.

Another group of cationic materials that may be used to precondition the color bodies are the fatty quaternary ammonium salts illustrated by such compounds as dodecyl trimethyl ammonium chloride, octadecyl triethyl ammonium sulfate, coco or tallow lower dialkyl ammonium halides.

Yet another group of compounds that may be used as conditioning agents are the well-known inorganic salt coagulants such as alum, fly ash, polyaluminum chloride and iron salts such as ferric chloride or ferric sulfate.

pH

In certain instances, color body removal can be enhanced by adjusting the pH of the paper mill waste water. A preferred pH range is 4 to 8 with a most preferred pH range being 5 to 7.

APPLICATION OF THE CONDITIONING AGENT TO THE PAPER MILL WASTE WATERS

As earlier indicated, the cationic conditioning flocculant described is preferably added to the paper mill waste water containing the color bodies prior to its contact with the activated carbon. The dosage is based upon solids present in the waste water, and depending upon the cationic flocculant, may be as little as 1–2 ppm up to 100 ppm. The typical dosage is 5–30 ppm. In our case, dosage may be determined by routine experimentation.

When the cationic flocculant is used to pretreat the activated carbon, it is conveniently used by passing a dilute solution through a bed of the activated carbon or the activated carbon may be slurried into a dilute solution of the cationic flocculant. The amount necessary to pretreat the carbon can be best determined by routine experimentation.

When the choice has been made to pretreat the carbon adsorbent, then it will be necessary to pretreat the adsorbent each time after it as been regenerated.

To illustrate several advantages of the invention, the following are given by way of example:

EXAMPLE 1

Three columns were prepared with −60+80 mesh material. They were: fly ash, sand and activated carbon. Before pumping the test solution through these columns, which has been 0.02% Kraft lignin, all columns were washed with 150 mls of DI $H_2O$. The lignin solution was pumped through in 50 ml increments after which the absorbance of the treated solution was always measured. Some filtrate samples have also been analyzed by both ICP and ion chromatography analyses.

The attached figures were generated from the absorbence data, collected as a function of the volume of 0.02% lignin solution pumped through the column. In FIG. 1 are shown all the data collected on the three adsorbents. From the sand data, it can be determined that only 24% of the lignin was removed before complete breakthrough. This amounted to $8.81 \times 10^{-4}$ g lignin removed/g sand. For the fly ash and carbon, using only the data in FIG. 1, which for these adsorbents have not reached complete breakthrough, 0.051g lignin/g carbon and 0.038g lignin/g fly ash were removed. Although the capacity per gram carbon may be higher, the % removed was higher for the fly ash. Reported as average percent removed, the fly ash achieved 72% removal while the carbon removed 48%.

It, however, may not be appropriate to include fly ash results herein the discussion on the adsorbents. In these experiments with fly ash, although some adsorption may take place, the primary mechanism of color removal using fly ash is likely a precipitation reaction between $Ca^{2+}$, dissolved from the ash, and the color bodies. This is supported by data indicating the presence of appreciable concentrations of $Ca^{2+}$ in the filtrate.

Figure 2:
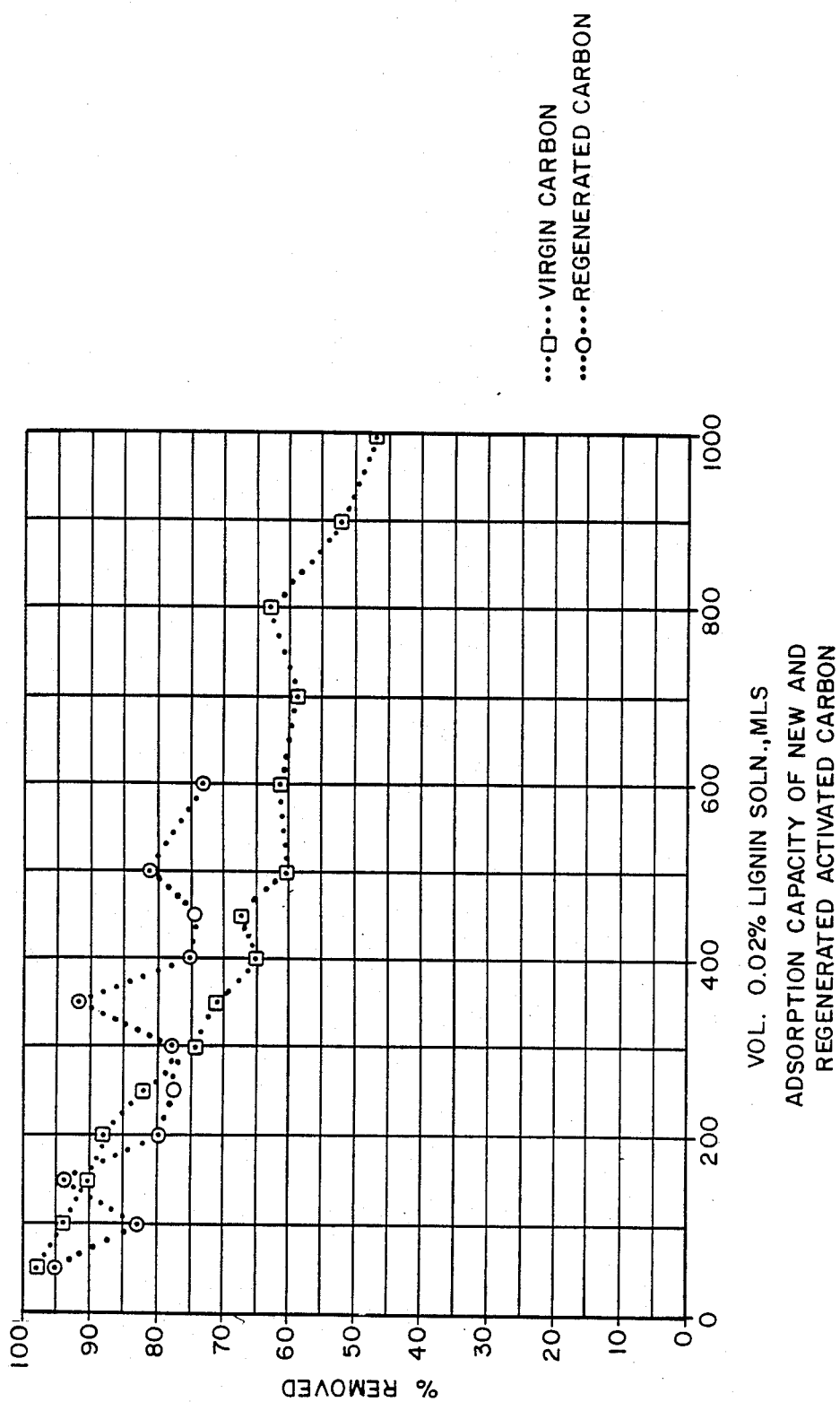
FIG. 2 shows adsorption capacity of new and regenerated activated carbon.

The carbon column, although not exhausted, appeared to have lined out at about 45% removed, so the carbon was removed in order to attempt a regeneration. In this initial test, at regeneration, the carbon was simply placed in a furnace at 400° C. in the presence of air for twenty-one hours. A column was then repacked and another adsorption test initiated. The removal data for the regenerated carbon are compared relative to the initial carbon data (of FIG. 1) in FIG. 2. As can be seen from these data, the regenerated carbon worked at least as well as the new carbon. Furthermore, the column packed with the regenerated carbon contained only 7.69 g of carbon versus 10.37 g in the initial column.

EXAMPLE 2

Using activated carbon as the adsorbent, one test was run where the 0.02% lignin solution (used in all studies as the synthetic colored waste solution) was conditioned with polydiallyl dimethyl ammonium chloride (polyDADMAC). For this test, 6.7 ppm (active) were used. To effect coagulation, a dose of more than five times this was required. In tests without the polyDADMAC, the very first filtrate sample (50 mils) shows a color removal level of 97%. In tests using the polyDADMAC conditioned lignin solution no color breakthrough was observed until 250 mils were passed through the carbon column.

EXAMPLE 3

The capacity of three materials for adsorbing Kraft lignin from solution was determined by preparing adsorption isotherms. The results for these three materials are provided in the attached Table I. The activated carbon is easily the best showing better than seven times more capacity than the silica gel and more than fifteen times that of the alumina. Table 1 also shows surface areas and pore volumes for the carbon and silica gel. Although data for the alumina are not available, it is likely that for the $Al_2O_3$, these values are less than those for the silica. Surface area and pore structure are very sensitive to the manner in which the material is prepared. Since the $Al_2O_3$ used in these studies was a technical grade, it is unlikely that any attempt is made in its preparation to maximize surface area and pore volume. It is interesting to note that the carbon, which has both the largest surface area and pore volume, has the highest capacity for lignin removal.

TABLE I

| Sample | Adsorbent Capacity[1] | | | |
|---|---|---|---|---|
| | Time to Reach Equilibrium, Min | Capacity @ Equilibrium g lignin/ g adsorbent | Surface Area $m^2/g$ | Pore Volume cc/g |
| CPG Activated Carbon | 300 | .061 | 1000–1100 | 0.90 |
| Silica Gel | 60 | .0083 | 720–760 | 0.43 |
| Powdered Alumina | 60* | .0039 | * | * |

[1]From 0.02% lignin solution
*Data not yet available

EXAMPLE 4

Another example of Calgon activated carbon, APA, was available so it was evaluated in the standard manner by determining its adsorption isotherm. This APA carbon has better than three times the capacity of CPG when compared by this test; even though it has only fifth percent more surface area.

EXAMPLE 5

Figure 3:
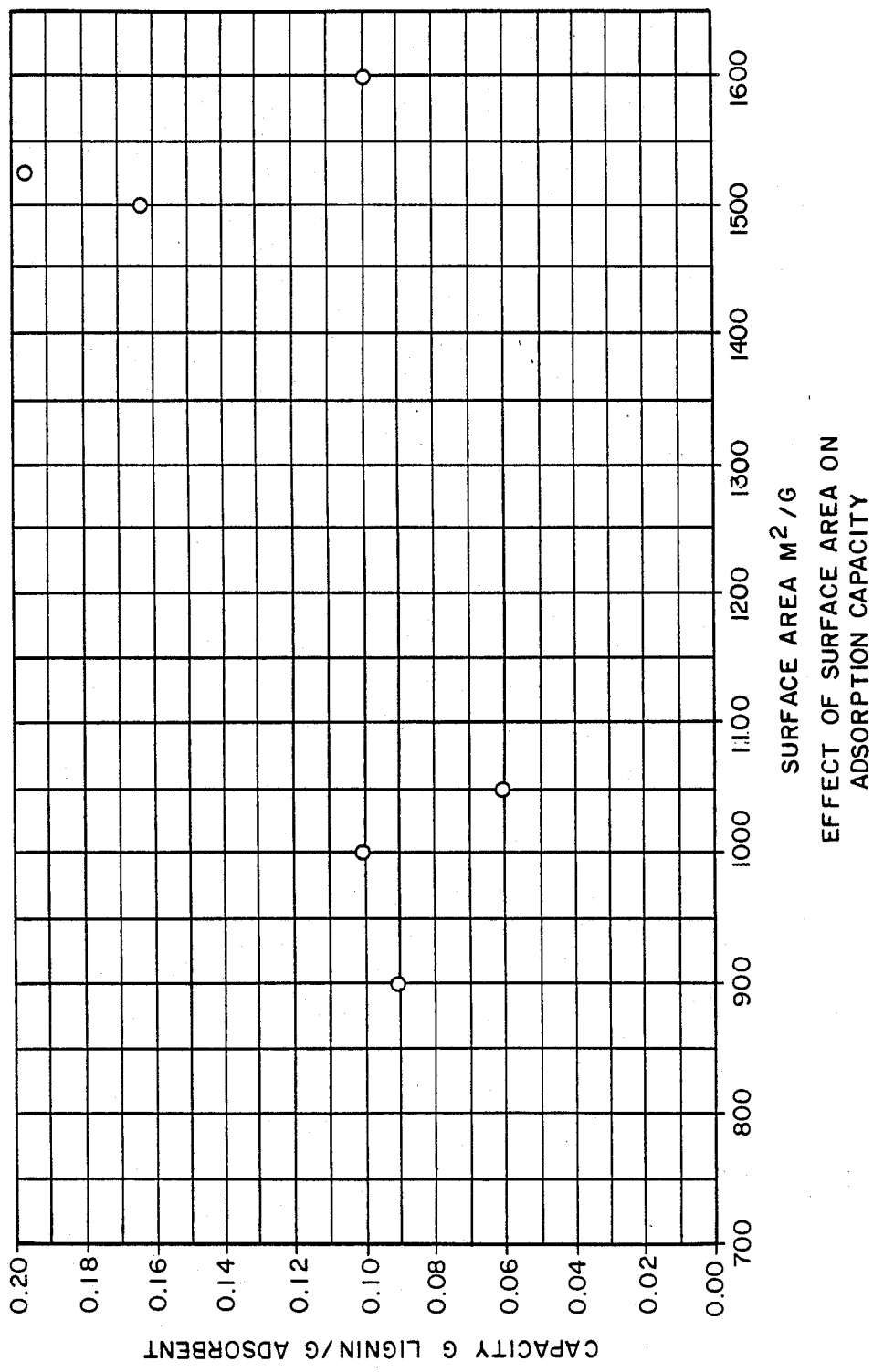
FIG. 3 shows the effect of surface area on adsorption capacity.

Table II shows data on other activated carbons. It is clear from these data that under the conditions of these adsorption experiments, activated carbon adsorbents have at least an order of magnitude higher capacity than other types of adsorbents for the solvated lignin used to make the synthetic colored solutions. It is also clear that while the samples which showed the highest capacity (APA and DARCO KB carbons) were those with the highest surface areas, having a high surface area, as does NUCHAR SA20, is not sufficient to ensure high capacity (see FIG. 3). The capacity of activated carbons is very dependent upon the process used to activate the carbon. The activation process is of interest because it may be possible to begin with coal as the adsorbent and during the regeneration operation to actually produce an activated carbon. Here, the process of regeneration would accomplish: (1) regeneration, (2) carbon activation, and (3) disposal of the adsorbed color bodies through either oxidation or pyrolysis. As can be seen from the data in Table II, it has already been demonstrated that coal does have some capacity to adsorb lignin from solution.

In Table II, the first column gives the time required to reach equilibrium. This time, determined from a rate study experiment with a fixed amount of adsorbent, is also the time used in each particular experiment for the determination of equilibrium capacity. The data in this column indicate significant differences in time even when only the activated carbon samples are considered. It is not likely that this would present difficulties in actual flow through column arrangements. The reason for this is that, as in the case of the APA activated carbon, while it may take six hours to reach equilibrium, over 90% of the total lignin adsorbed at equilibrium is adsorbed after only 90 minutes.

TABLE II

| Sample | Adsorbent Capacity[1] | | | |
|---|---|---|---|---|
| | Time to Reach Equilibrium, Min | Capacity @ Equilibrium g lignin/ g adsorbent | Surface Area $m^2/g$ | Pore Volume cc/g |
| APA Activated Carbon | 360 | .197 | 1525 | * |
| North River Energy Bituminous Coal | 120 | .0036 | * | * |
| Norit Granular Carbon | 420 | .081 | * | 1.2 |
| Darco KB Carbon | 450 | .164 | 1500 | 2 |
| Norit Rox 0.8 | 420 | .089 | 900 | 1 |
| Nuchar SA2O | 300 | .099 | 1400–1800 | 2.3 |
| Aqua Nuchar | 425 | .101 | 1000 | * |

[1]From 0.02% lignin solution
*Data not yet available

Lignin solutions were selected for this initial screening for several reasons. Dry Indulin C, or isolated Kraft lignin, is readily available so that solutions of the desired composition can be made up in the lab. Since the molecules which impart color to pulp mill wastes are primarily degraded Kraft Lignin, Kraft lignin provides a reasonable substitute to be used in the preparation of standard synthetic colored solutions.

The most common and simplest method for pulp waste characterization involves an absorption measurement at a wavelength near 450nm. pH should also be measured since the absorption is pH sensitive, increasing as pH goes up. Because the molar absorption coefficient is molecule specific, and the waste is comprised of many different molecules, measurement of absorption can give you only very limited information, telling you little about the concentration of the colored molecule unless a correlation had been previously established. An alternate means of establishing concentration involves adaptation of "Tappi Useful Method #251" which is used for measuring the amount of residual lignin in unbleached Kraft pulp. The method involves a permanganate oxidation for five minutes. The reaction is stopped by KI addition and the oxidized $I^-$ measured by $Na_2S_2O_3$ titration. Table III provides the initial results obtained with this method in samples of Kraft lignin and a bleach plant chlorination stage liquor. The variability of these two samples is apparent. The lignin sample takes more than four and a half times as much $KMnO_4$ to be oxidized than does the chlorination liquor. This is readily explained in as much as the primary differences between samples is that the bleach plant liquor contains lignin not removed by Kraft pulping which has undergone significant chlorine oxidation. When compared on a similar basis, the concentration of the chlorination liquor was 0.164 wt%. Although this is eight times the concentration of the lignin solution (on a weight basis), it shows less than three times (at 350 nm) the absorption at 350 nm, another suitable wavelength for measuring adsorption.

TABLE III

| Sample | Absorbance (pH 7) | | $KMnO_4$ Oxidation |
|---|---|---|---|
| | 340 nm | 450 nm | |
| Isolated Kraft Lignin 0.02% Solution | 1.21 | 0.15 | .0068 mole $MnO_4^{-1}$ g lignin |
| Bleach Plant Chlorination Liquor | 3.31 | 0.49 | .0015 mole $MnO_4^{-1}$ g oxidizable liquor solids |

EXAMPLE 6

In this Example, a sample of silica gel was selected. It was selected because it has in adsorption studies shown to be the worst. The first adsorbent to be modified was silica gel. It was modified by mixing 8 g in 400 mls of equimolar solutions of Arquad 12/50[1], sodium lauryl ether sulfate, an ethoxylated nonylphenol, polyDADMAC, and polyaluminum chloride. For the three surfactants, the solutions each contained 0.0017 mole in 400 mls. Enough was added to supply 0.0017 mole of Al and for the polyDADMAC sample, enough was added to supply 0.0017 mole of monomer units. The silica samples were mixed overnight in the 6 [1] 50% solution of dodecyl trimethyl ammonium chloride respective solutions, after which they were separated by filtration and dried at 110° C. Tests were run where the filtered adsorbents are used without drying since it can be expected that the drying process changes the molecules adsorbed on the surface. After drying, the removal activity of the treated silica gel samples was evaluated using a 0.02% lignin solution as the colored solution and standard adsorption test procedures. These tests indicated that the drying process did not affect the results. Previous studies with silica gel alone indicated 60 minutes were required to reach equilibrium. For these tests, 180 minutes were used to ensure that equilibrium was achieved. The results of these tests, expressed as % removed, are provided in the attached Table IV.

TABLE IV
ADSORPTION RESULTS: CHEMICALLY MODIFIED SILICA GELS

| Chemical Modifier | % Removed |
| --- | --- |
| Arquad 12/50 | 49.8 |
| Sodium Lauryl Ether Sulfate | 33.0 |
| Ethoxylated Nonylphenol | 11.6 |
| PolyDADMAC | 28.0 |
| Polyaluminum Chloride | 43.3 |
| Blank/Pure Silica Gel | 29.3 |

The silica gel itself was capable of removing 29% of the color. Treating the silica with Arquad 12/50 effected a 70% increase in the amount of color removed. Although the silica surface has a high affinity for polar compounds, as are the lignin molecules used to make up these color solutions, the ability of an adsorbent to remove a molecule from solution is also dependent upon the solubility of that molecule. In the case of the Arquad treated sample, the available positive sites supplied by the Arquad may help to reduce negative charge on the colored molecules and reduce their solubility effecting improved color removal.

EXAMPLE 7

Figure 4:
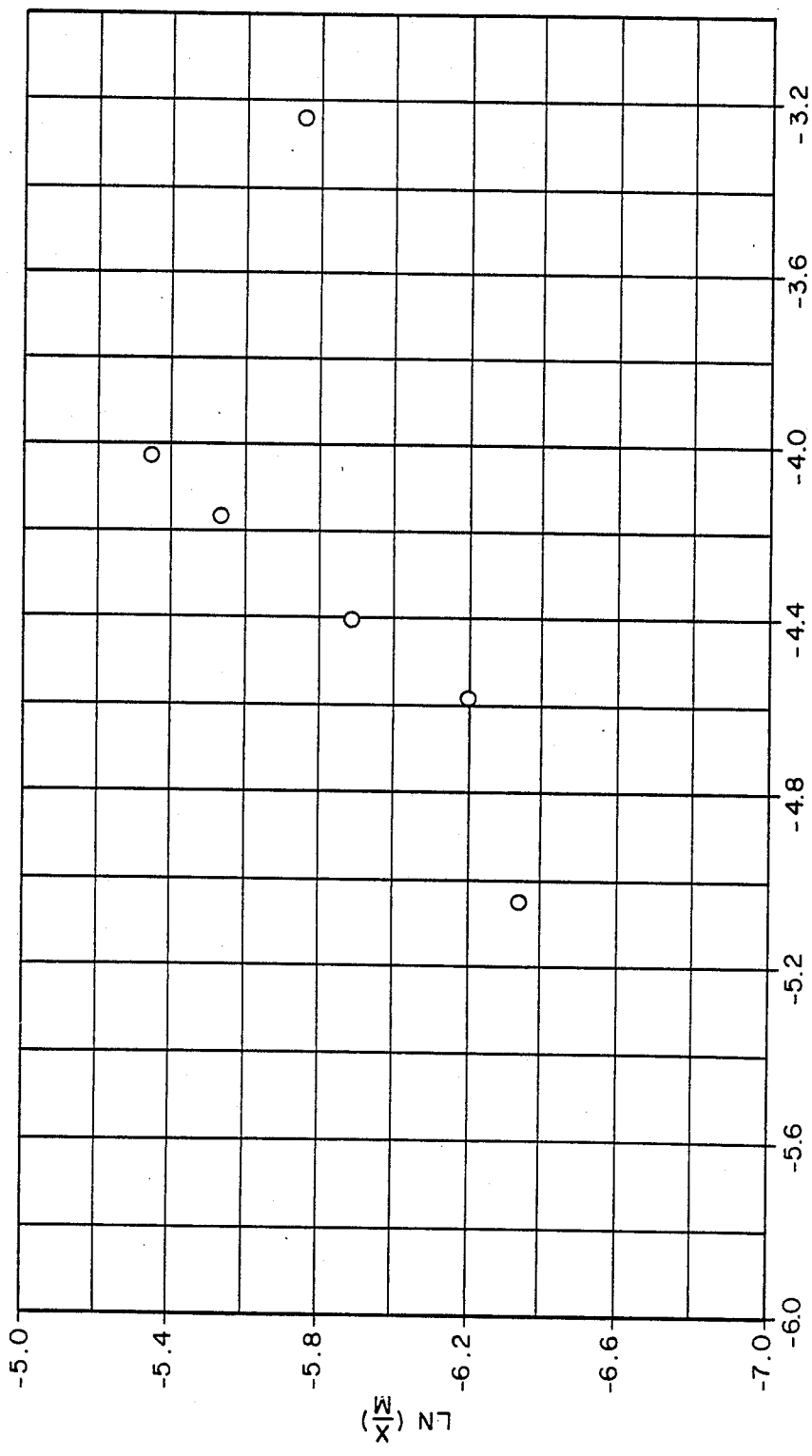
FIG. 4 shows adsorption isotherm/culligan anthracite and 0.02% lignin solution.

The adsorption capacities of samples of lignite, subbituminous, bituminous, and anthracite coals were examined. The same procedure which were used to determine the capacities of activated carbons were used; however, because of the more heterogeneous nature of the coals, linear plots were not obtained for the standard adsorption isotherm. This is demonstrated by FIG. 4. Since the capacity of the adsorbent under investigation, at the initial lignin concentration, is determined from the value of X/M (ordinate), where X is the weight of lignin adsorbed and M is the weight of coal used in the experiment, at that point where the isotherm is intersected by a line drawn from the point on the abscicca corresponding to the initial lignin concentration, another method must be used when a straight line fit is not obtained.

Table V contains estimates of the capacities of the four coal samples which have been examined. These values can only be used to compare the relative capacities of these coal samples. They were estimated by measuring the amount of lignin adsorbed at equilibrium in the rate study experiments. Using this method of estimating capacity on the better behaved activated carbon samples does not result in a value which agrees with the capacity determined from the adsorption isotherm.

TABLE V

| Coal Sample | g Lignin Removed/g Coal |
| --- | --- |
| Lignite | .0039 |
| Subbituminous | .0043 |
| Bituminous | .0024 |
| Anthracite | .0034 |

The trend of surface area for coals of different rank is to decrease in going from lignite to subbituminous to bituminous and then increase with anthracite. Bituminous coal which has the lowest surface area of coals of different ranks also has the lowest capacity for lignin removal as determined by these experiments. It is likely that selection of the right conditions for regeneration will result in the production of material with a much higher adsorptive capacity.

Figure 5:
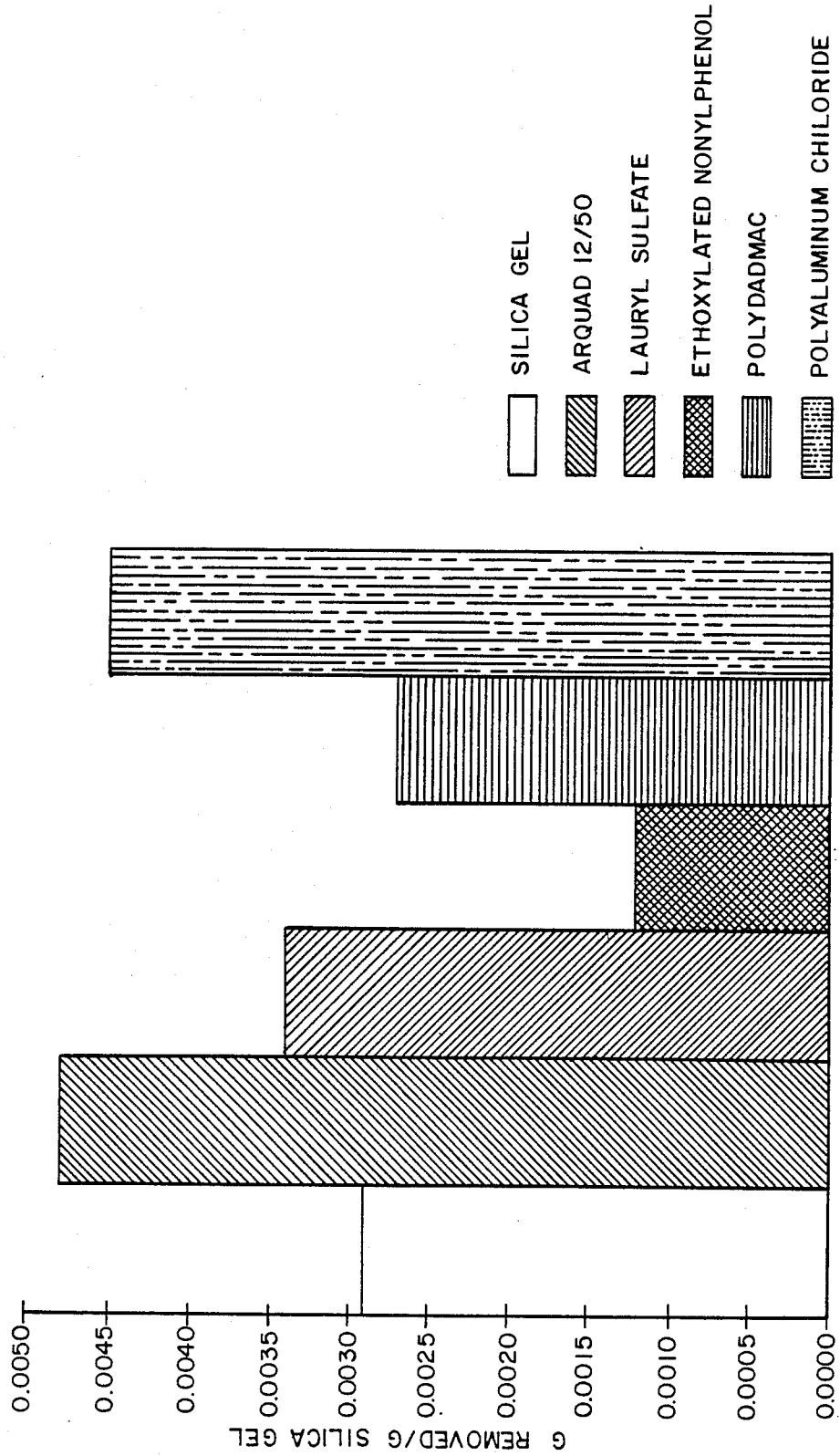
FIG. 5 shows color removal with conditioned silica gel.
Figure 6:
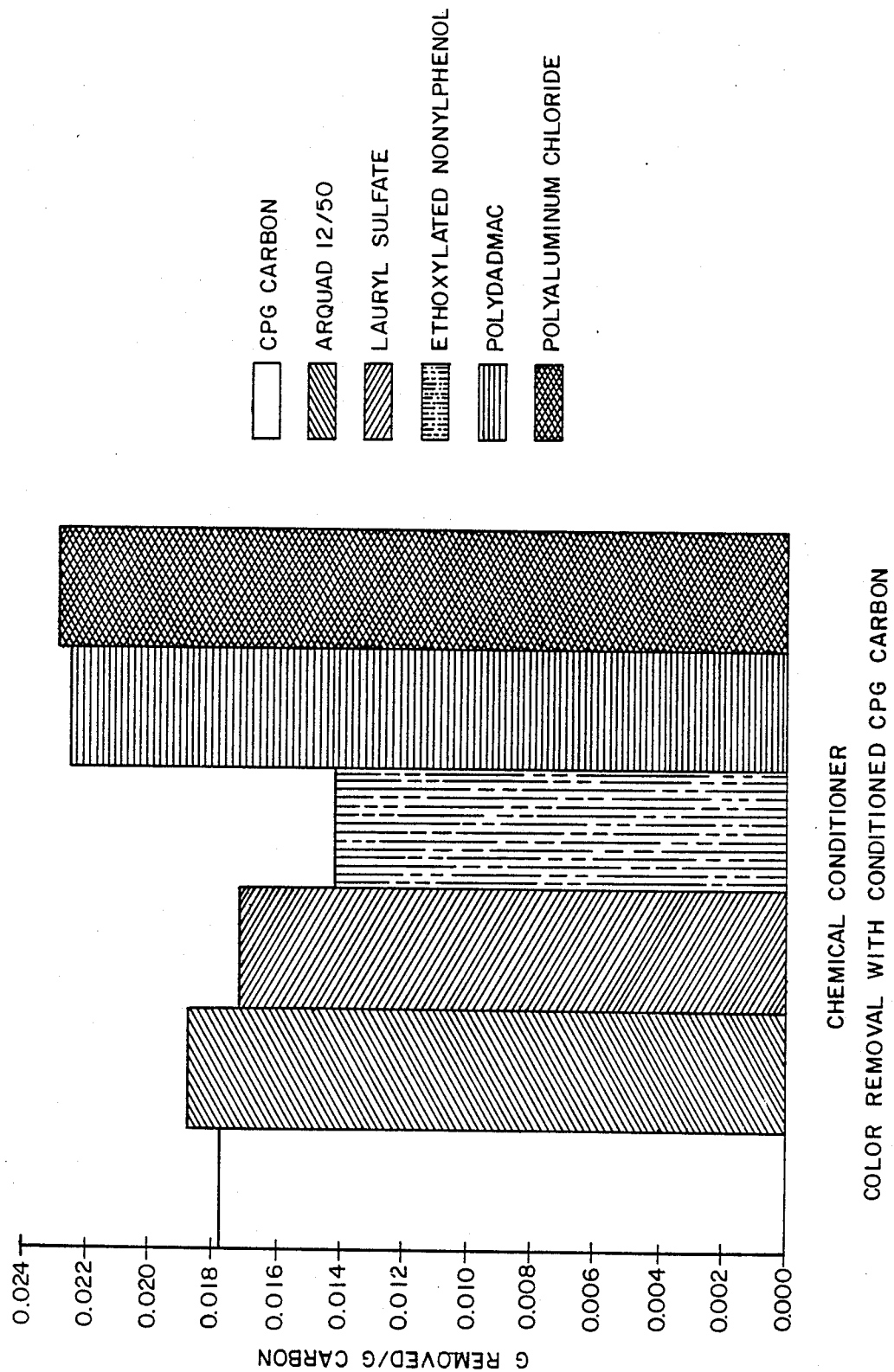
FIG. 6 shows color removal with conditioned CPG carbon.
Figure 7:
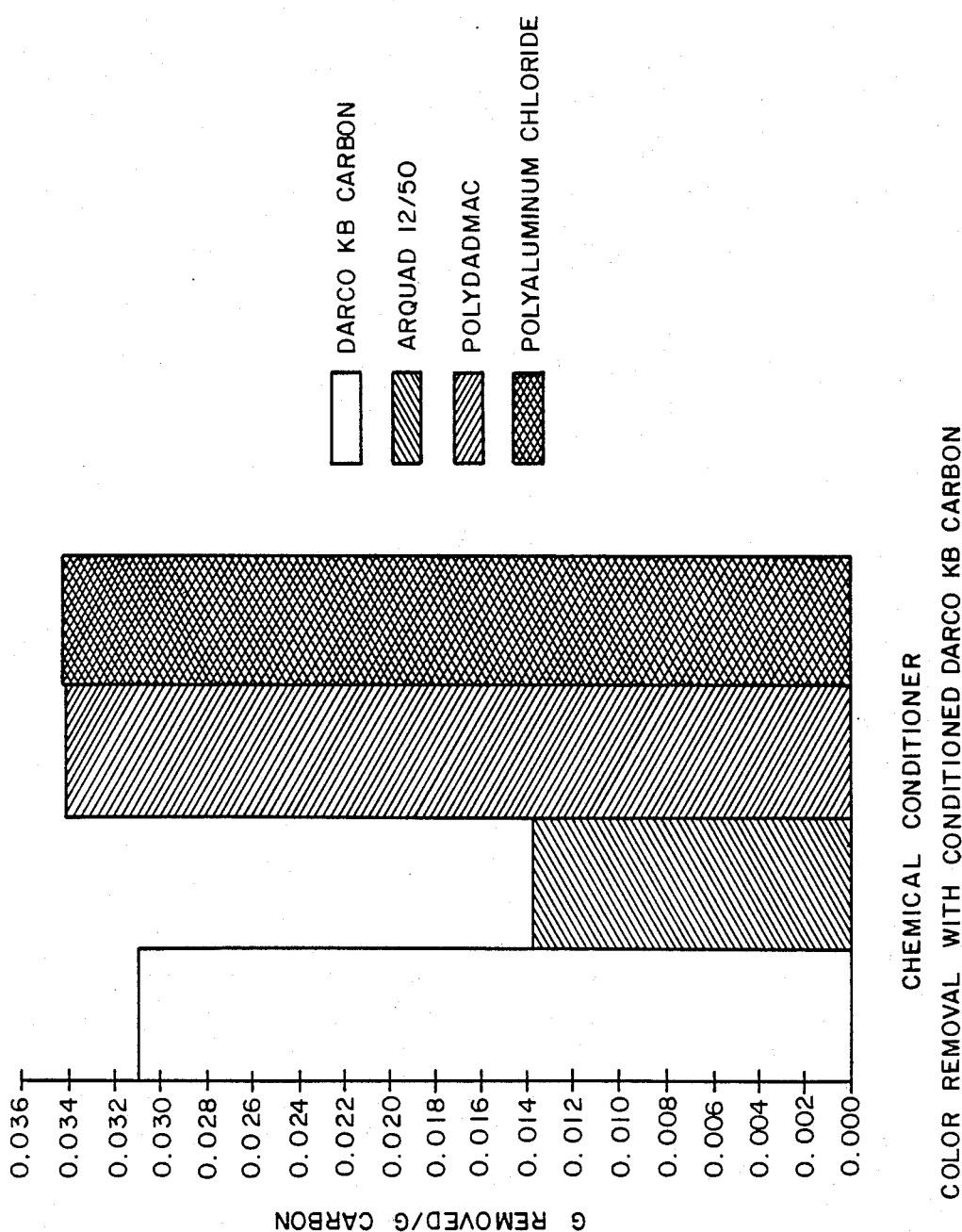
FIG. 7 shows color removal with conditioned Darco KB carbon.

The initial feasibility studies where a 0.02% lignin solution was pumped upflow through a packed column had demonstrated that improved removal could be achieved by preconditioning the lignin solution with polyDADMAC. Color removal can also be improved by conditioning the adsorbent. To investigate this, the effect of conditioning the adsorbent with Arquad 12/50, sodium lauryl ether sulfate, an ethoxylated nonylphenol, polyDADMAC, and polyaluminum chloride was examined. The adsorbents were conditioned by mixing them overnight with aqueous solutions of equivalent normality of the respective chemicals. Experiments were performed that established that this could be done reproducibly. The conditioned adsorbents were then separated by filtration and dried at 100° C. Drying the conditioned adsorbent under these conditions had no affect upon the activity of the conditioned adsorbent as determined by color removal experiments with conditioned samples not dried before use. Three adsorbents were conditioned: silica gel, Calgon CPG activated carbon, and DARCO KB activated carbon. These samples were selected because they represented adsorbents with capacities covering the entire range of all those so far evaluated, with silica gel being worst, DARCO KB best, and CPG somewhere in between. The results of the initial color removal experiments with conditioned adsorbents are shown in FIGS. 5, 6, and 7. As was observed in the initial evaluation, silica gel even after conditioning continues to show the worst activity, removing almost an order of magnitude less than is removed by the DARCO KB carbon. On an absolute basis the DARCO KB and CPG carbon samples both showed about the same increase in grams of lignin removed. i.e., ca. 0.003 g lignin/g adsorbent, for the polyDADMAC and polyaluminum chloride conditioned samples. With silica gel the greatest increase was for the Arquad conditioned sample, but it was only ca. 0.001 g/g silica gel. The lauryl sulfate which if adsorbed would increase the anionic character of the surface, had essentially no effect on either the CPG carbon or silica gel. This suggests that it doesn't adsorb. The ethoxylated nonylphenol in both instances effected a decrease in capacity for the respective adsorbent. Here the nonylphenol is probably adsorbing and occupying sites normally available to the lignin molecules.

Figure 8:
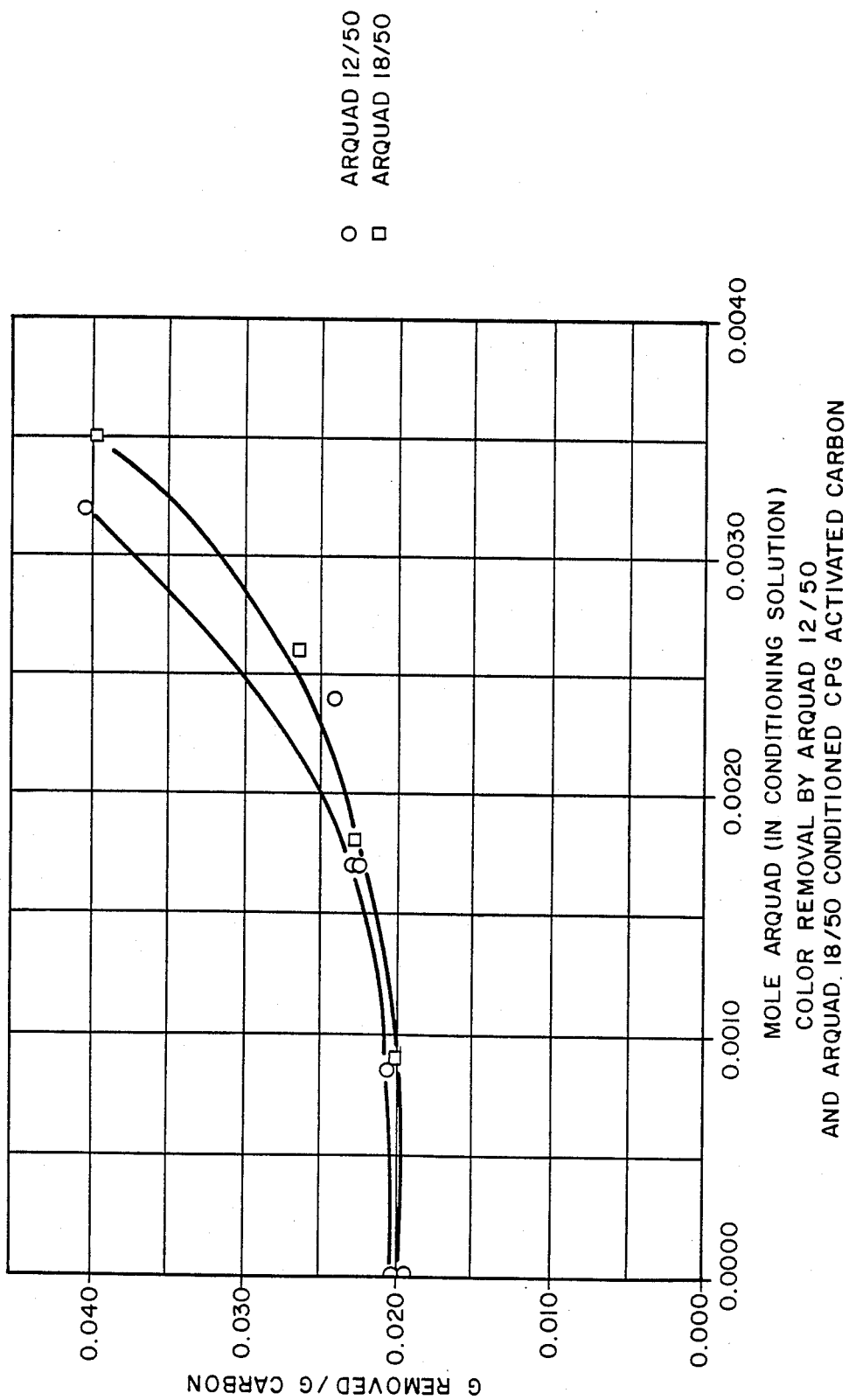
FIG. 8 shows color removal by Arquad 12/50 and Arquad 18/50 conditioned CPG activated carbon.

Another set of experiments was performed where CPG carbon was conditioned by increasing amounts of Arquad 12/50 and Arquad 18/50. FIG. 8 shows the results of the color removal experiments with these samples. At the lower levels, equal amounts of the Arquad 12 and 18 effect almost an identical increase in the grams of lignin removed. As the moles of Arquad in the conditioning solution are increased beyond 0.002, differences begin to appear. These differences may result because at the higher concentrations it becomes more difficult for the bigger Arquad 18 ($C_{18}H_{37}N(CH_3)_3Cl$) to find room to adsorb.

Figure 9:
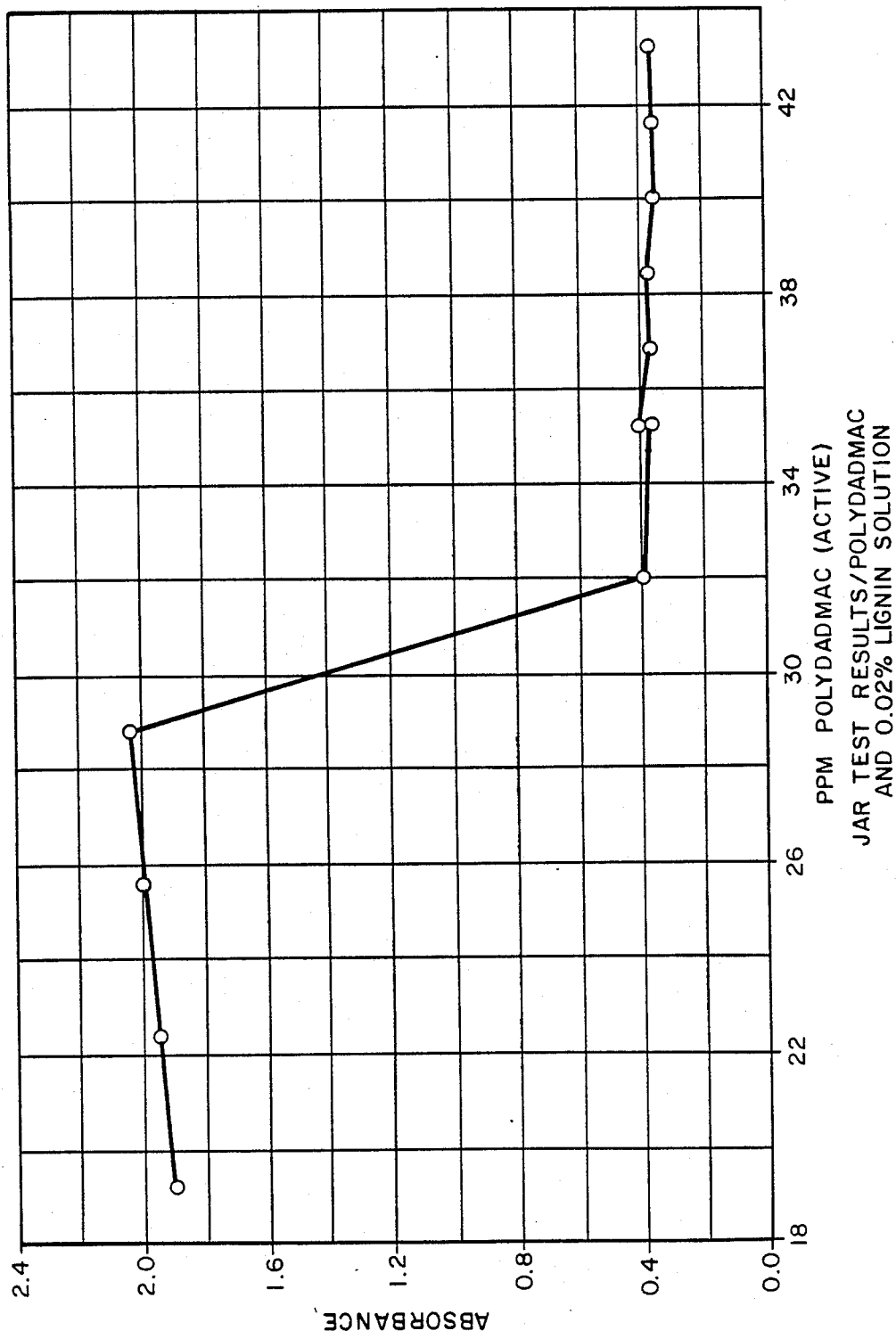
FIG. 9 shows jar test results/polyDADMAC And 0.02% lignin solution.

A standard jar test was run using the same 0.02% lignin solution used in the adsorption studies described above and polyDADMAC as the chemical program. The results of this test are provided in FIG. 9 which show that 32 ppm active polyDADMAC are required to precipitate the lignin. This results in 5 g of lignin being removed for each gram of polyDADMAC. From the data collected on color removal by polyDADMAC conditioned CPG carbon only 0.08 g of lignin are removed by each gram of polyDADMAC. In initial experiments done where the lignin solution is first conditioned by the polyDADMAC and then treated with CPG carbon the ratio is about 13 g lignin removed per g of DADMAC added.

EXAMPLE 8

Figure 10:
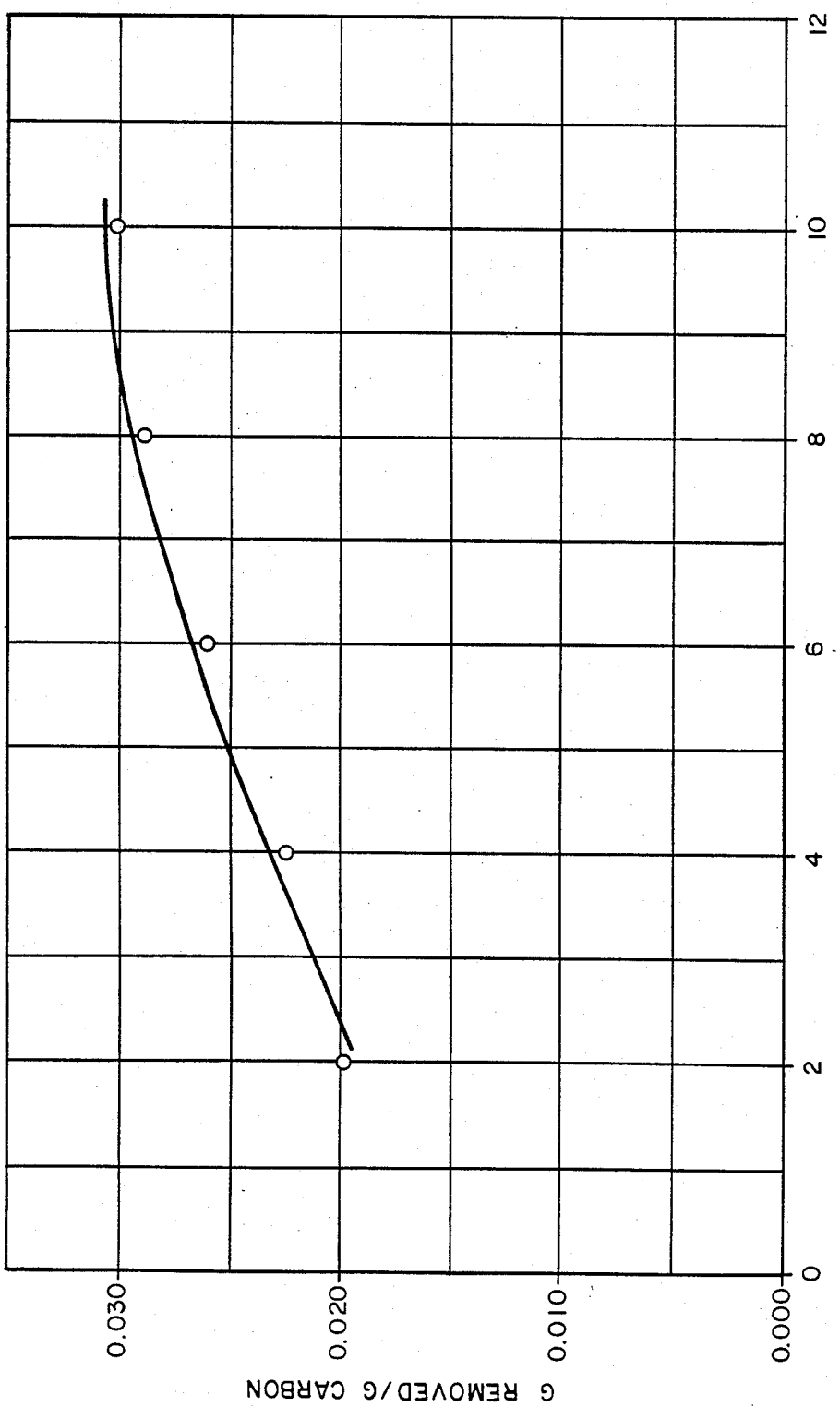
FIG. 10 shows waste conditioning by polyDADMAC/effect on color removal at constant carbon dose.

In standard jar tests, polyDADMAC can be used to decolorize the 0.02% lignin solution. The efficiency of polyDADMAC towards lignin (color) removal, when used in this fashion, if 5 g of lignin removed per gram of polyDADMAC. Using polyDADMAC to precondition a CPG activated carbon sample, there was improved color removal; however, the efficiency of polyDADMAC used in this manner was only 0.08 g lignin removed per gram of DADMAC. This value was determined by measuring the increased lignin removal for the conditioned CPG sample relative to untreated CPG at several polyDADMAC doses. This is about 63 times less efficient than simple coagulation/precipitation. When the lignin solution itself was conditioned, a significant improvement in color removal and efficiency of polyDADMAC use were realized. In FIG. 10, the effect of conditioning the 0.02% lignin solution with increasing amounts of polyDADMAC (active) are shown. Here, a fixed weight of carbon, 0.50 g, was used. From this experiment, the efficiency of polyDADMAC use for color removal was 12-13 (g lignin removed/g polyDADMAC calculated on a per gram carbon basis), which is almost three times that for standard coagulation/precipitation. Because one of the driving forces behind adsorption from solution is the solubility of the adsorbate in the solvent, it is likely the polyDADMAC in part functions by reducing the anionic charge of the solvated color molecules and, in this fashion, reduces their solubility which promotes adsorption. These results clearly demonstrate that the adsorption process can be improved with chemical and that much more efficient use of this chemical is realized by applying it directly to the waste prior to adsorption rather than applying it to the adsorbent. Furthermore, from the data shown in FIG. 11, it appears that conditioning the waste will not have any adverse effects upon the rate at which these color molecules become adsorbed.

EXAMPLE 9

Figure 12:
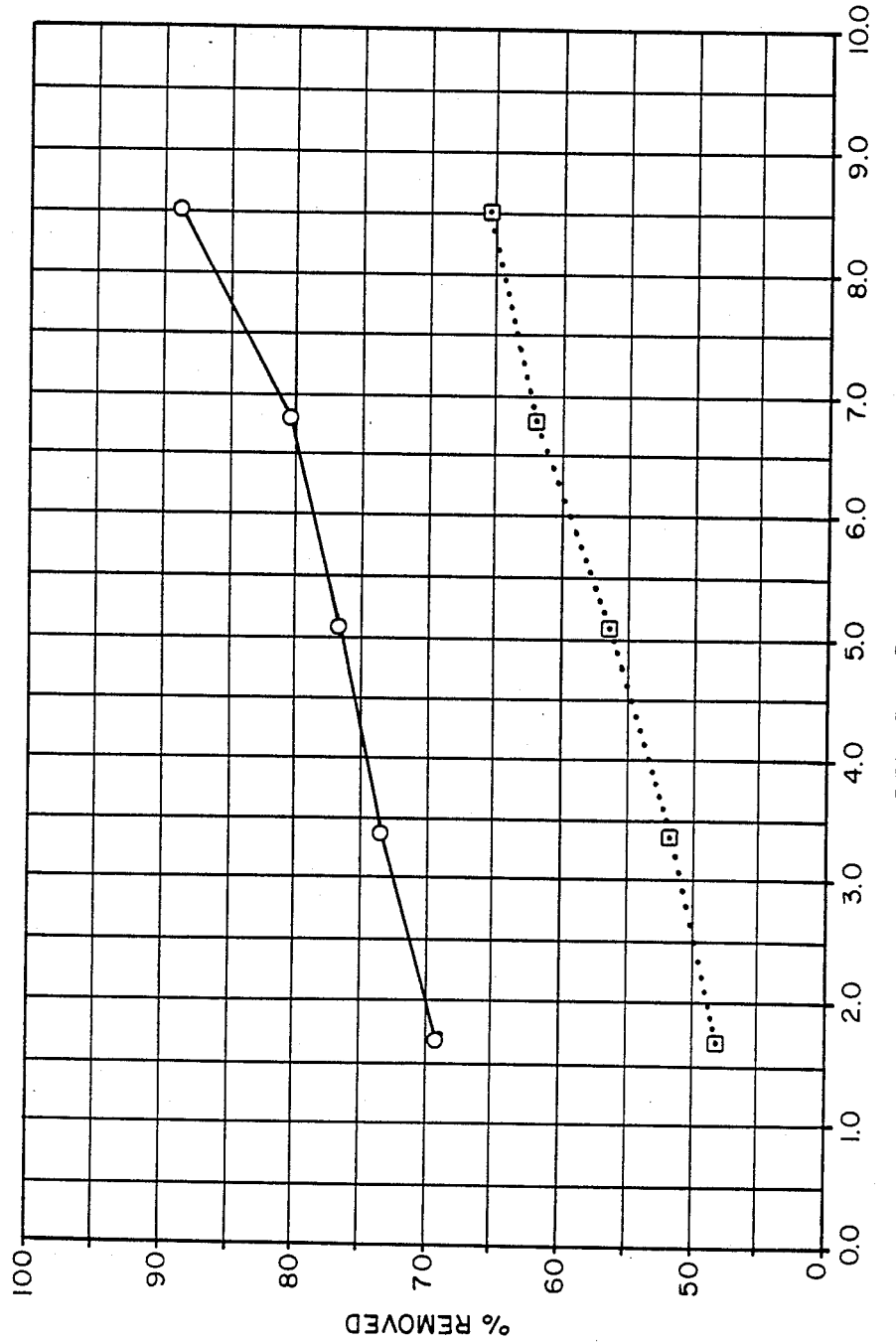
FIG. 12 shows effect of epi/dma pretreatment and pH on color removal using CPG activated carbon.
Figure 13:
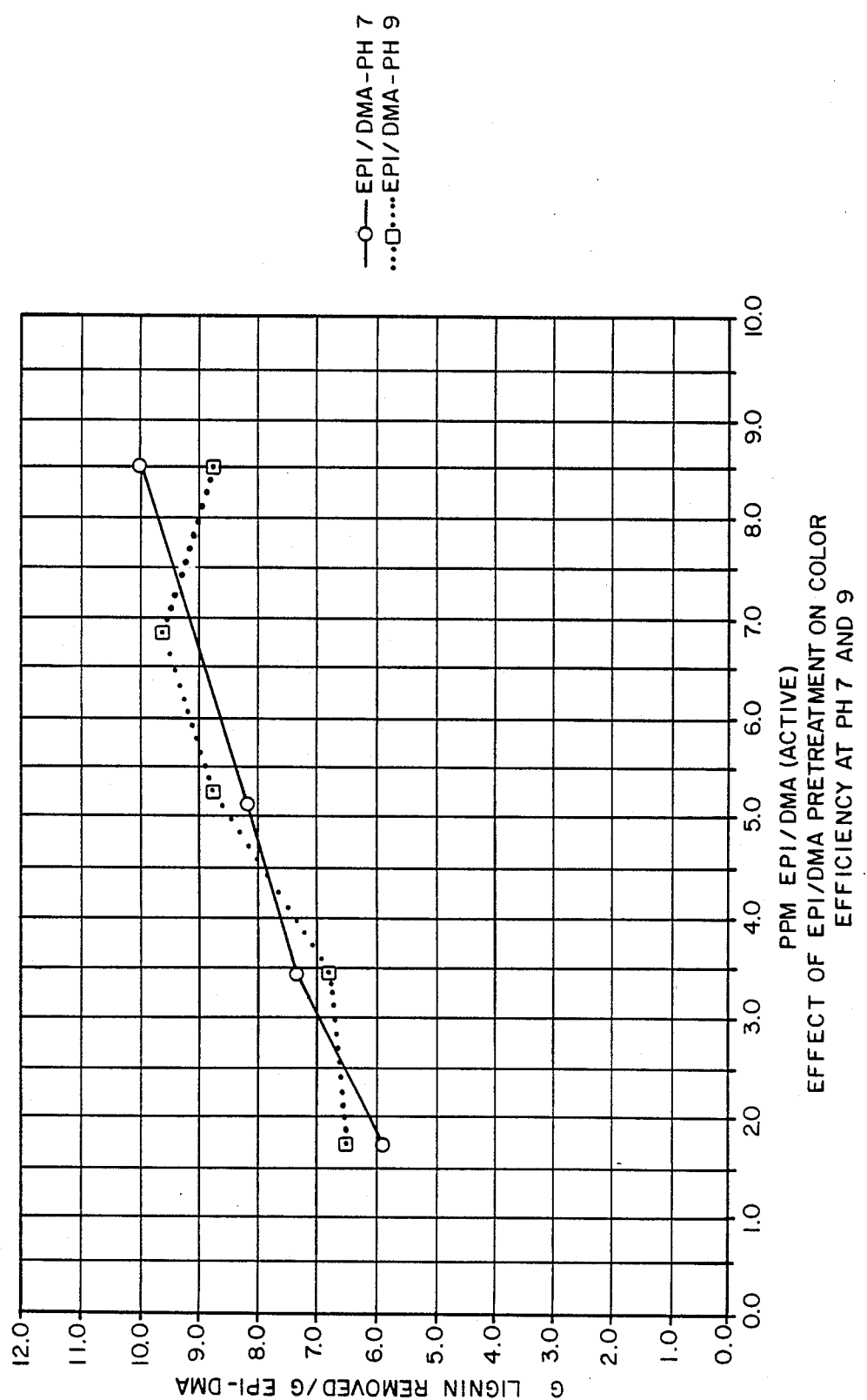
FIG. 13 shows effect of epi/dma pretreatment on color efficiency at pH 7 and 9.

Using polyDADMAC to condition the colored lignin solution 12-13 g of lignin could be removed per g of polyDADMAC in adsorption experiments. Performing the same type of experiment with EPI/DMA[1], up to 10 g of lignin could be removed for each gram of EPI/DMA[2]. These tests were run at pH 9.18. Dropping the pH to 7 increases the amount removed by about 20%, as shown in FIG. 12. FIG. 13 shows the data on the increased lignin removal resulting from pretreatment with EPI/DMA. The values on the ordinate were determined by finding the difference in lignin removal between the amount removed at the respective EPI/DMA dose and the amount removed by carbon treatment alone. Although dropping the pH increased substantially the amount of lignin which could be removed by this type of treatment, it had no effect on the impact of the chemical pretreatment on color removal.

[1] Quaternary polymer of epichlorohydrin & dimethyl amine MW 20,000 weight average.
[2] Similar results have also been obtained with EPI/DMA polymers which have been cross-linked with ammonia, ethylenediamine, and hexamethylene diamine and with an ethylenedichloride ammonia condensation polymer. Indeed, all low molecular weight cationic water-soluble polymers can function in this manner.

[1] Quaternary polymer of epichlorohydrin & dimethyl amine MW 20,000 weight average.
[2] Similar results have also been obtained with EPI/DMA polymers which have been cross-linked with ammonia, ethylenediamine, and hexamethylene diamine and with an ethylenedichloride ammonia condensation polymer. Indeed, all low molecular weight cationic water-soluble polymers can function in this manner.

EXAMPLE 10

Figure 11:
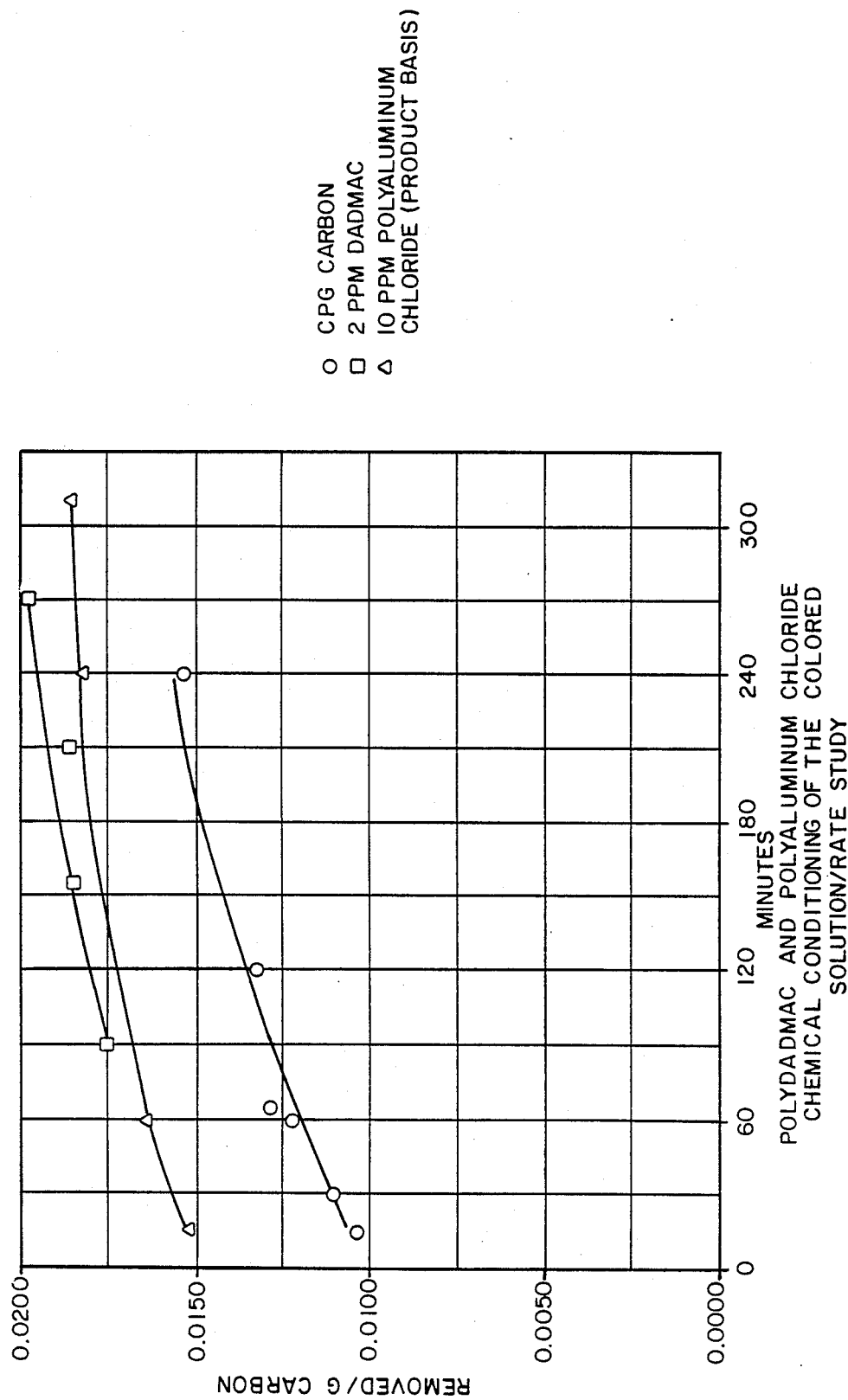
FIG. 11 shows polyDADMAC and polyaluminum chloride chemical conditioning of the colored solution/rate study.
Figure 14:
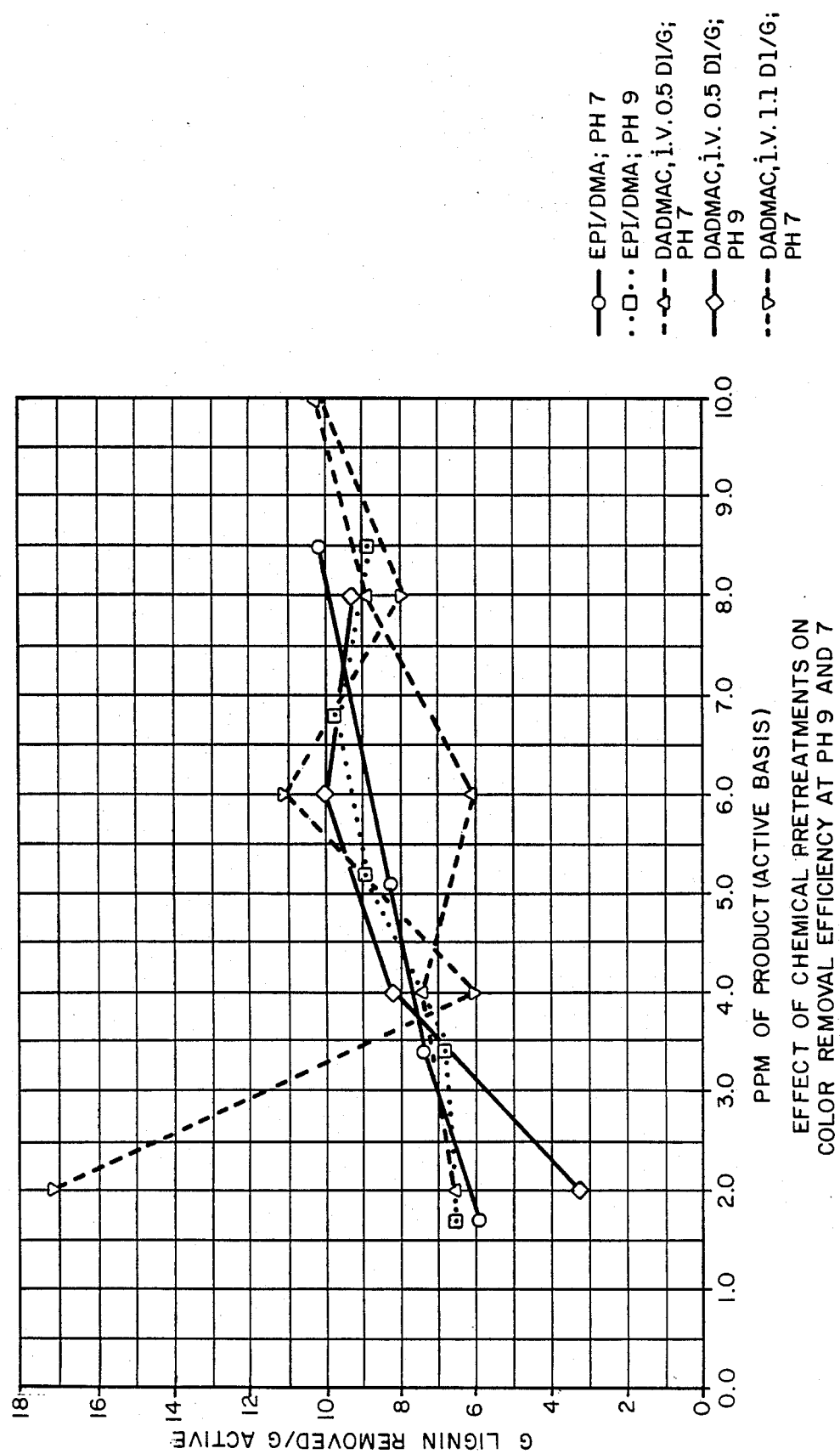
FIG. 14 shows effect of chemical pretreatments on color removal efficiency at pH 9 and 7.
Figure 15:
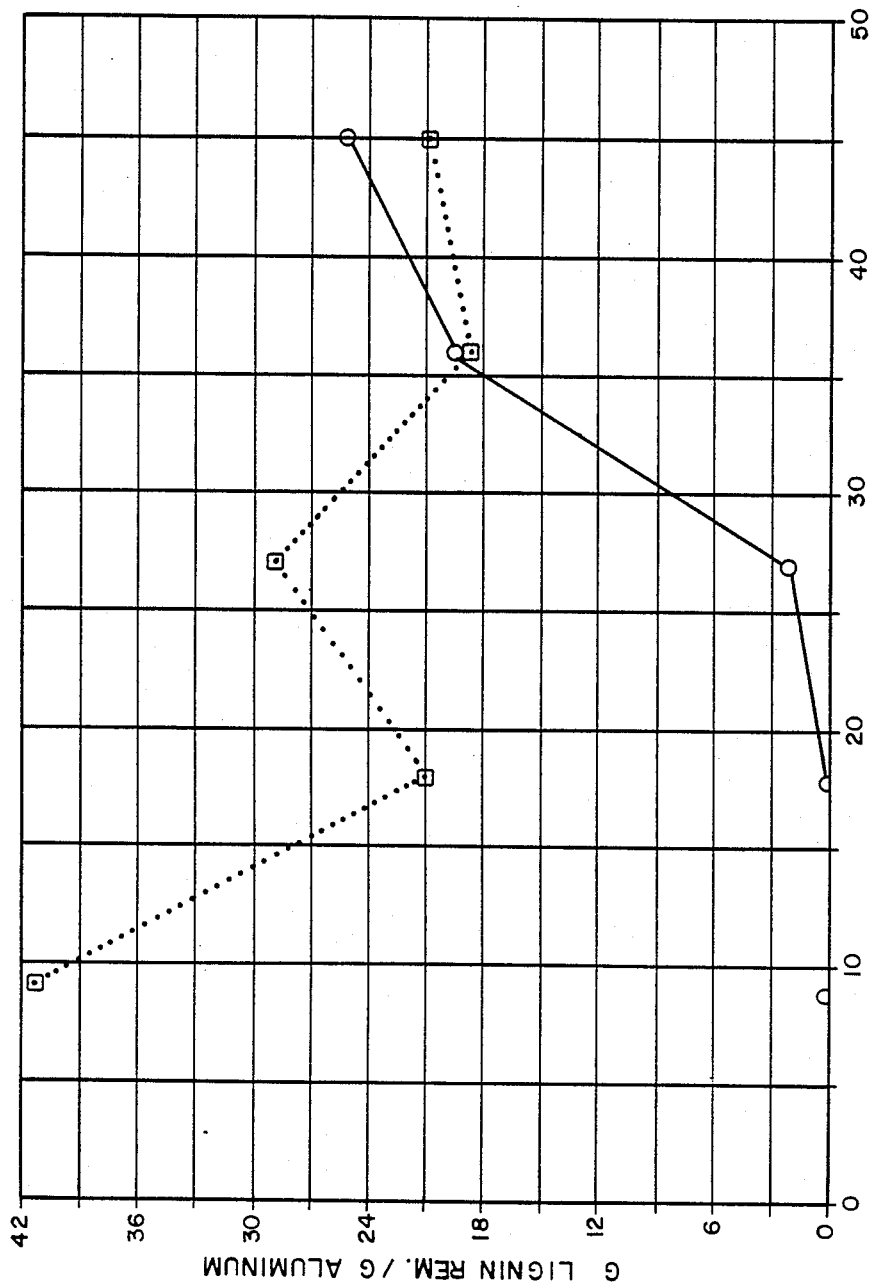
FIG. 15 shows effect of polyaluminum chloride pretreatment on color removal efficiency at pH 9 and 7.

PolyDADMAC, linear EPI/DMA, and a high basicity polyaluminum chloride were examined for their ability to promote color removal. These tests were run by dosing the respective chemical to the lignin solution just prior to mixing this solution with the activated carbon. The results of these tests are shown in FIGS. 14 and 15. Although there is some scatter to the DADMAC data, there does not appear any consistent, significant difference between products. In the molecular weight range covered by the polyDADMACs, there is no effect of this parameter on pretreatment effectiveness. This is also true when comparing EPI/DMA with the DADMAC products. Treatment pH, between the range of 7-9, had no effect on the increased amount of lignin which could be removed by the respective chemical pretreatment. It does, however, have a substantial impact on the ultimate removal level, increasing the amount of lignin removed by 25-30% for a pH drop of 9 to 7. The 0.8-1.1 dl/g polyDADMAC pH7 data point at 2 ppm appears well out of line with all other data. This may be the result of an error during product dosage, i.e., if 3 ppm were actually dosed rather than 2 ppm, the value of the ordinate would change from 17 as shown in FIG. 14 to 11.3, a value more in line with all other data.

FIG. 13 shows similar data but for a high basicity polyaluminum chloride. Here the effect of pH is more dramatic. This is to be expected based upon the behavior of aluminum solutions at different pH. The isoelectric point for aluminum is at a pH of about 6.5. The higher the pH, the more negative character the aluminum species will acquire. With polyaluminum chloride even at pH 9, there will be some cationic species present, although less than pH 7. Consequently, at the lower dose at pH 9, there may be cationic species present, but at an insufficient concentration to effect any increase in the amount of lignin removed be subsequent activated carbon treatment.

If the values on the ordinates for FIGS. 14 and 15 are compared, it can be seen that the amount of lignin removed per gram of polyaluminum chloride is, at pH 7, more than double that removed by either EPI/DAM or the DADMACs. It is possible that this is simply a reflection of the difference in unit weight for the organic polyelectrolytes and the aluminum. For EPI/DMA and DADMAC, the monomer unit weights are 137.5 and 161.5 g/mole respectively. For aluminum it is 27 g/mole; however, we are using polyaluminum chloride and do not really known what the unit weight actually is.

Having thus described my invention, I claim:

1. A method of decoloring pulp mill waste waters which contain color bodies which comprises the steps:
   (a) contacting these waste waters with a water-soluble cationic flocculant in an amount sufficient to condition the color bodies present therein, said amount being less than that which would produce flocculation or coagulation of the color bodies;
   (b) contacting the waters produced in step (a) with a carbon adsorbent whereby the color bodies are adsorbed from the waste waters.
   (c) removing the adsorbent from contact with these waste waters when it has adsorbed substantial quantities of the color bodies,
   (d) heat treating the adsorbent at a temperature of at least 250° C. for a period of time sufficient to pyrolyze a substantial portion of the color bodies adsorbed by the adsorbent, and then, (e) repeating steps (a) through (d).

2. The method of claim 1 wherein the carbon adsorbent is activated carbon.

3. The method of claim 2 where the water-soluble flocculant is a polydiallyl dimethyl ammonium chloride.

4. The method of claim 1 wherein the carbon adsorbent is contained in a column.

5. The method of claim 4 where the carbon adsorbent is activated carbon.

6. The method of decoloring pulp mill waste waters which contain color bodies which comprises the steps:

(a) pretreating a carbon adsorbent with a water-soluble cationic flocculant in an amount sufficient to condition the adsorbent;

(b) contacting the waste waters with the carbon adsorbent pretreated in step (a) whereby the color bodies are adsorbed from the waste waters, (c) removing the adsorbent from contact with these waste waters when it has adsorbed substantial quantities of the color bodies.

(d) heat treating the adsorbent at a temperature of at least 250° C. for a period of time sufficient to pyrolyze a substantial portion of the color bodies adsorbed by the adsorbent, and then, (e) repeating steps (a) through (d).

7. The method of claim 6 where the carbon adsorbent is activated carbon.

8. The method of claim 7 where the water-soluble flocculant is a polydiallyl dimethyl ammonium chloride.

9. The method of claim 6 where the carbon adsorbent is contained in a column.

10. The method of claim 9 wherein the carbon adsorbent is activated carbon.

* * * * *